(12) United States Patent
Olsen

(10) Patent No.: US 8,266,807 B2
(45) Date of Patent: Sep. 18, 2012

(54) MEASURING APPARATUS AND SYSTEM

(75) Inventor: Darren Olsen, Auburn, AL (US)

(73) Assignee: Auburn University, Auburn, AL (US)

( * ) Notice: Subject to any disclaimer, the term of this patent is extended or adjusted under 35 U.S.C. 154(b) by 0 days.

(21) Appl. No.: 13/163,875

(22) Filed: Jun. 20, 2011

(65) Prior Publication Data

US 2012/0042527 A1    Feb. 23, 2012

Related U.S. Application Data

(60) Provisional application No. 61/376,117, filed on Aug. 23, 2010.

(51) Int. Cl.
*G01B 11/27* (2006.01)

(52) U.S. Cl. ..................................... 33/286; 33/DIG. 21

(58) Field of Classification Search .................... 33/228, 33/286, DIG. 21
See application file for complete search history.

(56) References Cited

U.S. PATENT DOCUMENTS

| | | | |
|---|---|---|---|
| 6,293,024 B1 * | 9/2001 | Fiebig et al. | 33/375 |
| 6,438,854 B1 * | 8/2002 | Kott, Jr. | 33/286 |
| 6,453,568 B1 * | 9/2002 | Hymer | 33/276 |
| 7,121,010 B2 * | 10/2006 | Marshall et al. | 33/286 |
| 2005/0172502 A1 * | 8/2005 | Sergyeyenko et al. | 33/286 |
| 2008/0282561 A1 * | 11/2008 | Burry et al. | 33/286 |
| 2011/0265336 A1 * | 11/2011 | Bascom et al. | 33/286 |

* cited by examiner

*Primary Examiner* — G. Bradley Bennett
(74) *Attorney, Agent, or Firm* — Gardner Groff Greenwald & Villanueva, PC

(57) ABSTRACT

The present invention relates to measuring apparatus for pulling a measurement from an underlying base structure. In one aspect, the present invention is a measuring apparatus having a rigid body and means for coupling the body to an underlying base structure. The rigid body includes a first laser and is adapted to receive a portion of a tape measure therein. The means for coupling the rigid body to the underlying base structure can be one or more conventional fasteners, such as, but not limited to, a bar clamp, suction cups, screws, bolts, nails, pins, hooks, hook and loop fastener, snaps, clips, brackets, and/or sleeves. Generally, the first laser is oriented such that light emitted from the laser is projected about 90 degrees from the face of the underlying structure.

20 Claims, 7 Drawing Sheets

MEASURING APPARATUS AND SYSTEM

CROSS-REFERENCE TO RELATED APPLICATION

This application claims the priority benefit of U.S. Provisional Patent Application Ser. 61/376,117, filed Aug. 23, 2010, which is incorporated herein by reference.

TECHNICAL FIELD

The present invention relates to the field of measuring implements, and more particularly, to an apparatus and system for taking measurements.

BACKGROUND

In the construction industry the majority of building components are laid out using a series of right angles. Traditionally, when performing layouts on smaller structures such as a residential home, a tradesman's primary tool is the tape measure, which is used to locate points in a two dimensional plane.

For example in residential buildings utilizing slab-on-grade subfloors, many utilities (water, electric) are placed beneath the slab. Before the slab is poured the utilities are "stubbed-up" to target future walls or specific locations within slab which will later be connected to fixtures and equipment. If the utilities penetrate the slab in the wrong location, a portion of the slab will have to be removed and the utilities will have to be re-routed. This error can result in cost over-runs and delays.

Typically, prior to laying out the slab penetrations, a slab edge form has been constructed in place and the dirt building pad has been graded. The slab edge form is a mold typically made of lumber, and the inside faces of the slab edge form represents the perimeter of the slab-on-grade. Utilizing the slab edge form as a baseline (x axis), tradesmen will mark the locations of the future wall intersections on the slab edge form. From that point, tradesman will then pull an offset (y axis) to locate the correct point within the wall for the utility to penetrate the slab. This offset is subject to angular error. For instance, if the tradesman does not hold the tape at a perfect ninety degree angle to the baseline edge form, there is potential for the utility to penetrate the slab outside of the future wall—even if the tradesman is off by only a degree or two. Presently, to correct the angular error, tradesmen may take the additional step(s) of setting a temporary point as discussed in the steps above, and then moving that point along its x axis by pulling the same dimension that was used to initially locate the wall from an adjacent slab edge form. To utilize this method to correct for angular deviation the edge form must be a closed-in square or rectangle. Another alternative to correct for angular error is to use a 3-4-5 triangle or the Pythagorean Theorem. This alternative often requires a minimum of two tape measures and multiple tradesmen.

Thus, traditional methods of tape measure layout require a number of steps and introduce numerous variables when attempting to pull a perpendicular dimension. Accordingly, it can be seen that needs exist for an improved measuring apparatus and system for utilizing the same. It is to the provision of these needs and others that the present invention is primarily directed.

SUMMARY

In example embodiments, the present invention relates to a measuring apparatus for pulling a measurement from an underlying base structure. In one aspect, the present invention is a measuring apparatus having a rigid body and means for coupling the body to an underlying base structure. The rigid body includes a first laser and is adapted to receive a portion of a tape measure therein. The means for coupling the rigid body to the underlying base structure can be one or more conventional fasteners, such as, but not limited to, a bar clamp, suction cups, screws, bolts, nails, pins, hooks, hook and loop fastener, snaps, clips, brackets, and/or sleeves. Generally, the first laser is oriented such that light emitted from the laser is projected about 90 degrees from the face of the underlying structure.

In another aspect the present invention is a system for measuring having a measuring apparatus and a first reflector that is adapted to be secured to an underlying base structure. The measuring apparatus includes a rigid body incorporating a first laser and means for coupling the body to the underlying base structure. The first laser is generally oriented in a direction substantially perpendicular to the face of the underlying structure.

In still another aspect, the present invention includes a method of measuring. The method includes the step of coupling a measuring apparatus to an underlying structure, wherein the measuring apparatus includes a first laser oriented substantially perpendicular to the underlying structure and a second laser oriented substantially parallel to the underlying structure. The method also includes the steps of securing a first reflector to the underlying structure, aligning light emitted from the second laser with the first reflector, coupling a tape measure to the measuring apparatus, and pulling a measurement from the underlying structure.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

DETAILED DESCRIPTION OF EXAMPLE EMBODIMENTS

Figure 1:
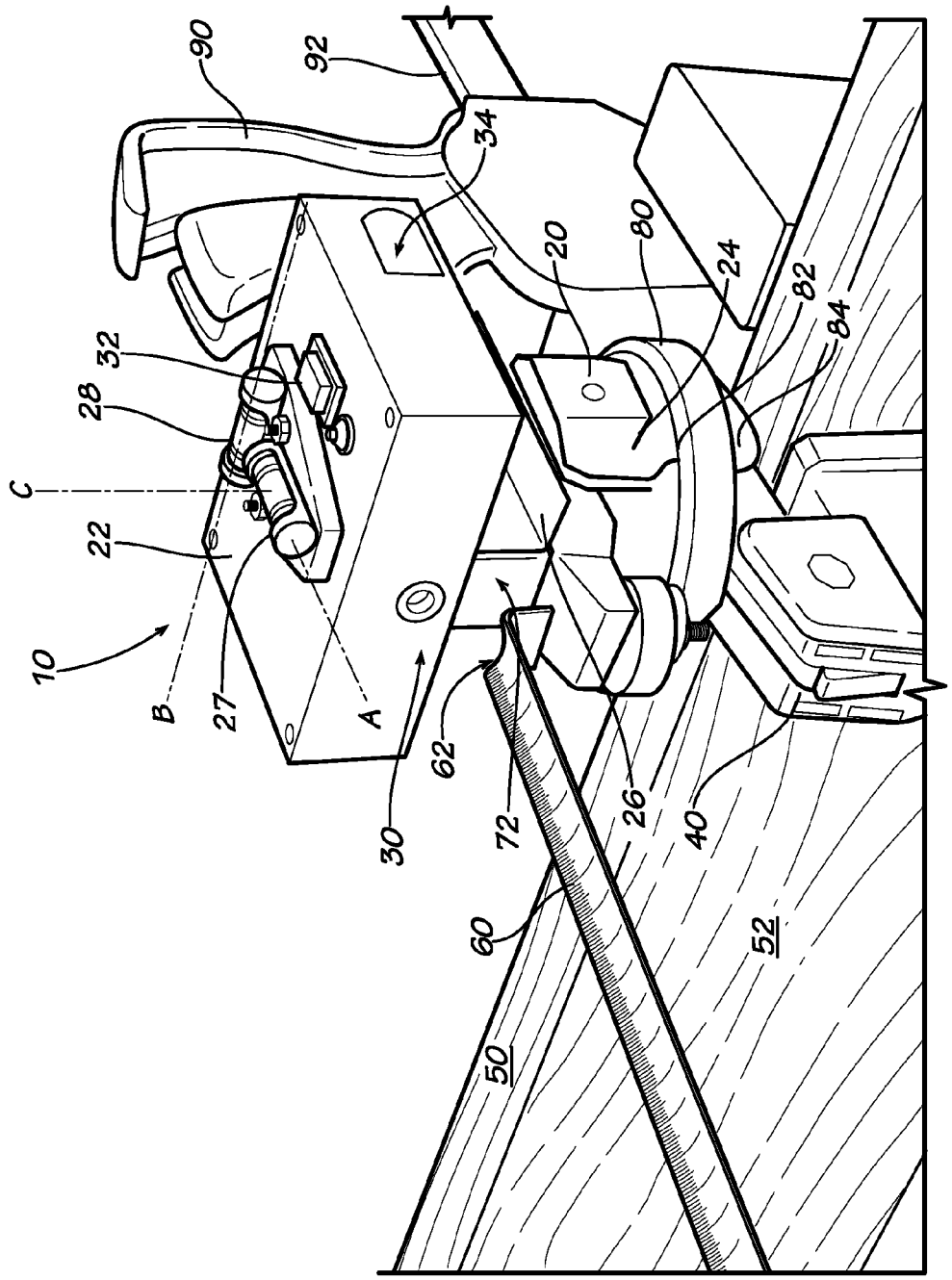
FIG. 1 is a perspective view of a measuring apparatus according to an example embodiment of the present invention.

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

With reference now to the drawing figures, wherein like reference numbers represent corresponding parts throughout the several views, FIGS. 1-7 depict example embodiments of a measuring apparatus 10 according to the present invention. The measuring apparatus 10 allows a single tradesman to quickly and easily pull a measurement from a wall, slab edge form, etc. at a precise angle as desired by a user. In particular, the measuring apparatus 10 can be used to pull a measurement at a right angle (90 degrees) from an underlying base edge. As such, the present invention eliminates (or greatly reduces) the need for tradesman to make angular corrections and reduces the time and number of tradesman needed to perform such measurements.

As depicted in FIG. 1, the measuring apparatus 10 of the present invention generally includes a body 20 having coupling means 40 for securing the same to a piece of lumber, slab edge form, wall, or other surface as desired, and a laser 30 (or comparable light source) for emitting a beam of light away from the body. While the coupling means 40 are shown as a bar clamp in the accompanying drawing figures, other example embodiments of the present invention can include various other conventional fasteners, such as suction cups, screws, bolts, nails, pins, hooks, hook and loop fastener(s), snaps, clips, brackets, sleeves, or any other known fasteners and/or connectors capable of coupling the body 20 to an underlying building structure.

In example embodiments, the body 20 includes a top portion 22, a bottom portion 24, and an intermediate portion 26 positioned between both the top and bottom portions, as seen in FIG. 1. In alternative embodiments, one or more of the portions (22, 24, 26) can be combined, reconfigured, or removed as desired. Generally, the top portion 22 houses a first laser 30 and any accompanying power requirements, such as, but not limited to, one or more batteries, electrical connectors, wires, etc. In preferred example embodiments, laser 30 projects a beam of light in a direction that is substantially perpendicular to the face 52 of an underlying base structure 50. In other embodiments, the laser 30 can be mounted to the body 20 as desired, and/or can be movable and calibrated to suit the needs of a particular tradesman. Additional lasers 34, 36 can be added as desired to project one or more beams of light along a plane that is substantially parallel to the face 52 of the underlying base structure 50 and/or 90 degrees from the direction of laser 30. The top portion can also include a switch 32, operable to turn laser 30 on and off as desired by a user (and/or operate lasers 34 and 36). Switch 32 can be any conventional switch known to one of ordinary skill in the art for operating lights and/or lasers. Moreover, as seen in the drawing figures, the top portion 22 can include a first level indicator 27 for determining the orientation of the measuring apparatus 10 along a first axis (denoted as axis "A") and/or a second level indicator 28 for determining the orientation of the measuring apparatus along a second axis (denoted as axis "B").

Figure 2:
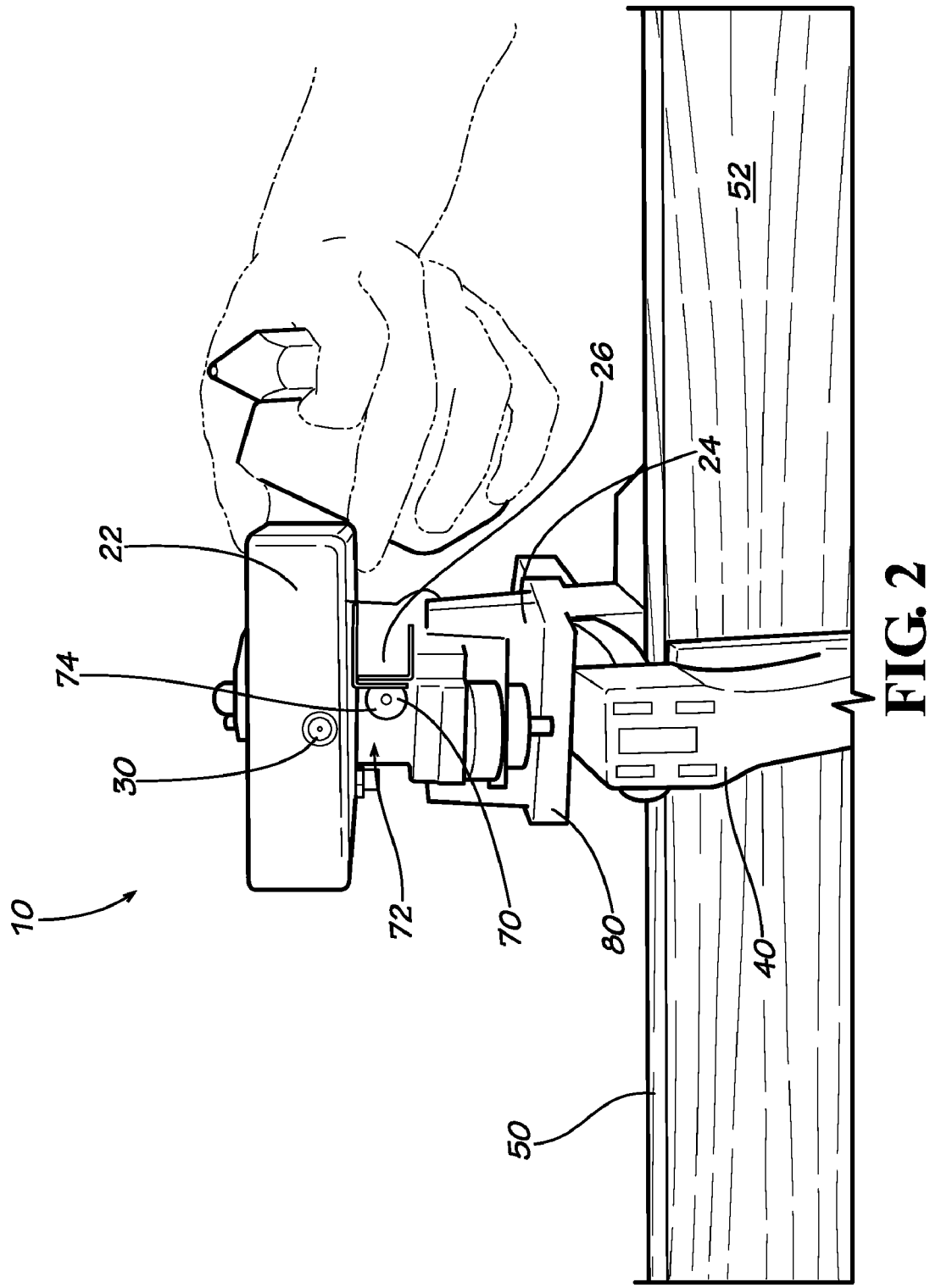
FIG. 2 is another perspective view of the measuring apparatus of FIG. 1.

The intermediate portion 26 is operable to receive a portion of a tape measure 60, such as a ferromagnetic tape catch 62 that is commonly featured at the terminal end of traditional tape measure, as seen in example embodiments. For instance, as best seen in FIG. 2, the intermediate portion 26 can include one or more magnets 70 located within channel 72 to magnetically secure a traditional tape measure 62 that is inserted therein. Alternatively, the channel 72 can include a clip, slot, or other fastener for removably coupling a tape measure 62 therein. In preferred embodiments, the channel 72 is sized and shaped to receive a plurality of various tape hook sizes and/or configurations. In depicted example embodiments, the terminal end of the channel 72 generally includes a contact face 74 that is substantially aligned with the face 52 of the underlying base structure 50. In alternative embodiments, the intermediate portion 26 can include a convenient built-in measuring tape and/or a laser distance measuring tool to aid a user in obtaining measurements from the measuring apparatus 10 of the present invention.

The bottom portion 24 preferably includes a rotatable base 80, as shown in depicted example embodiments, that permits the measuring apparatus to rotate about a third axis (denoted as axis "c"). Optionally, the bottom portion 24 can include a protractor or dial 82 to denote the angular orientation of the laser 30. In still other embodiments, the bottom portion is rigidly fixed and is incapable of rotating. In such embodiments, it is preferred that the measuring apparatus be fixed in a position that directs the laser 30 in a substantially perpendicular direction from the face 52 of the underlying base structure. Additionally, the bottom portion is coupled to, or inclusive of, the coupling means 40 for securing the measuring apparatus to the underlying base structure. In depicted example embodiments, the base 80 includes a slidable receptor 84 that is adapted to slide over and along the bar 92 of a traditional bar clamp 90, as seen in FIGS. 1 and 2. In alternative embodiments, the bottom portion 24 can be releaseably or permanently connected to the coupling means 40 through the use of various known fasteners and configurations as appreciated by one of ordinary skill in the art.

Figure 3:
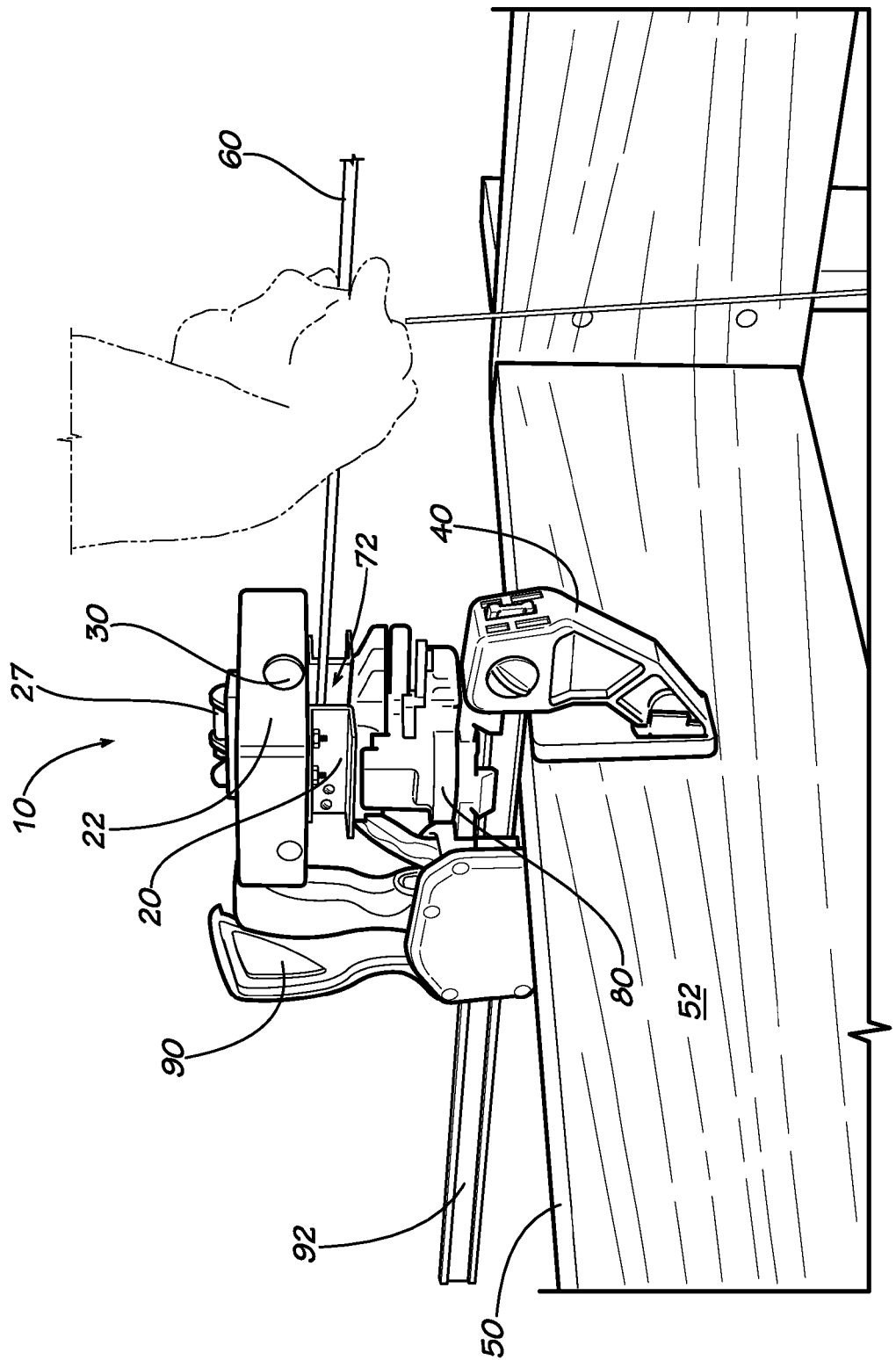
FIG. 3 is another perspective view of the measuring apparatus of FIG. 1.
Figure 4:
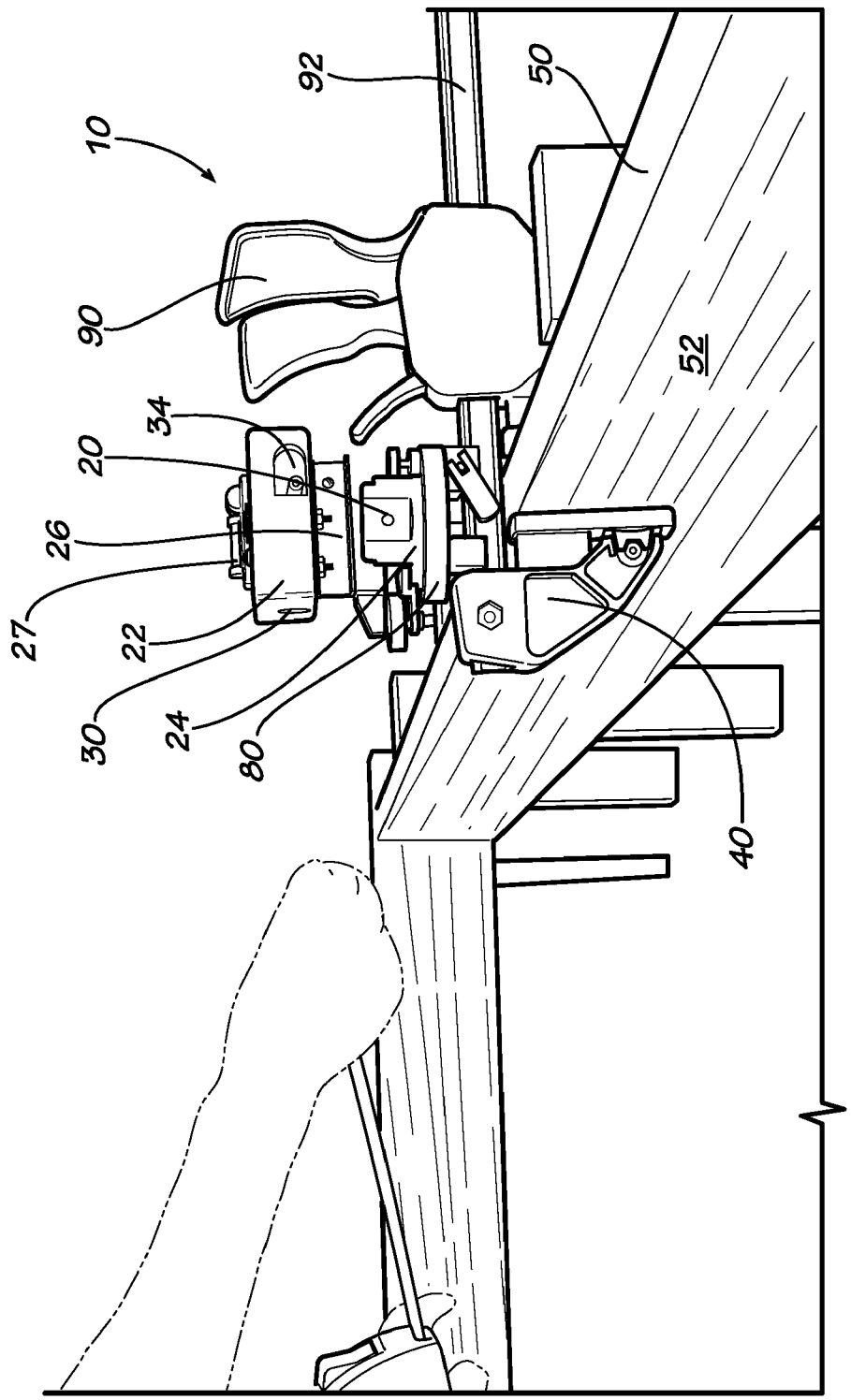
FIG. 4 is another perspective view of the measuring apparatus of FIG. 1.

The present invention also includes a system 100 for utilizing the measuring apparatus 10 as described above to take measurements from an underlying base structure at precise angles therefrom. In example embodiments, the system 100 can also optionally include a first reflector 110 that can be releaseably or permanently mounted to the underlying base structure 50 as seen in FIG. 3. In example embodiments the first reflector 110 is adapted to fit over a piece of dimensional lumber (i.e. 2"×4", 2"×6", etc.). In alternative embodiments, the reflector can be coupled to a wide range of building materials including, but not limited to, dimensional lumber, composite wood/lumber, brick, stone, concrete blocks, etc. The system 100 can also optionally include a second reflector 120 similar to reflector 110. The location of the first 110 and second 120 reflectors is determined by the user based on the distance from the base unit. Specifically, a skilled artisan can appreciate that the greater the distance between the base unit and the reflector(s) results in increased angular alignment precision. The reflectors can be formed from almost any material/color that would permit a laser (or comparable light source) to be seen when directed at and/or reflected off the same.

In operation, the measuring apparatus 10 can be coupled to an underlying base structure 50 as best seen in FIGS. 1 and 2.

Figure 5:
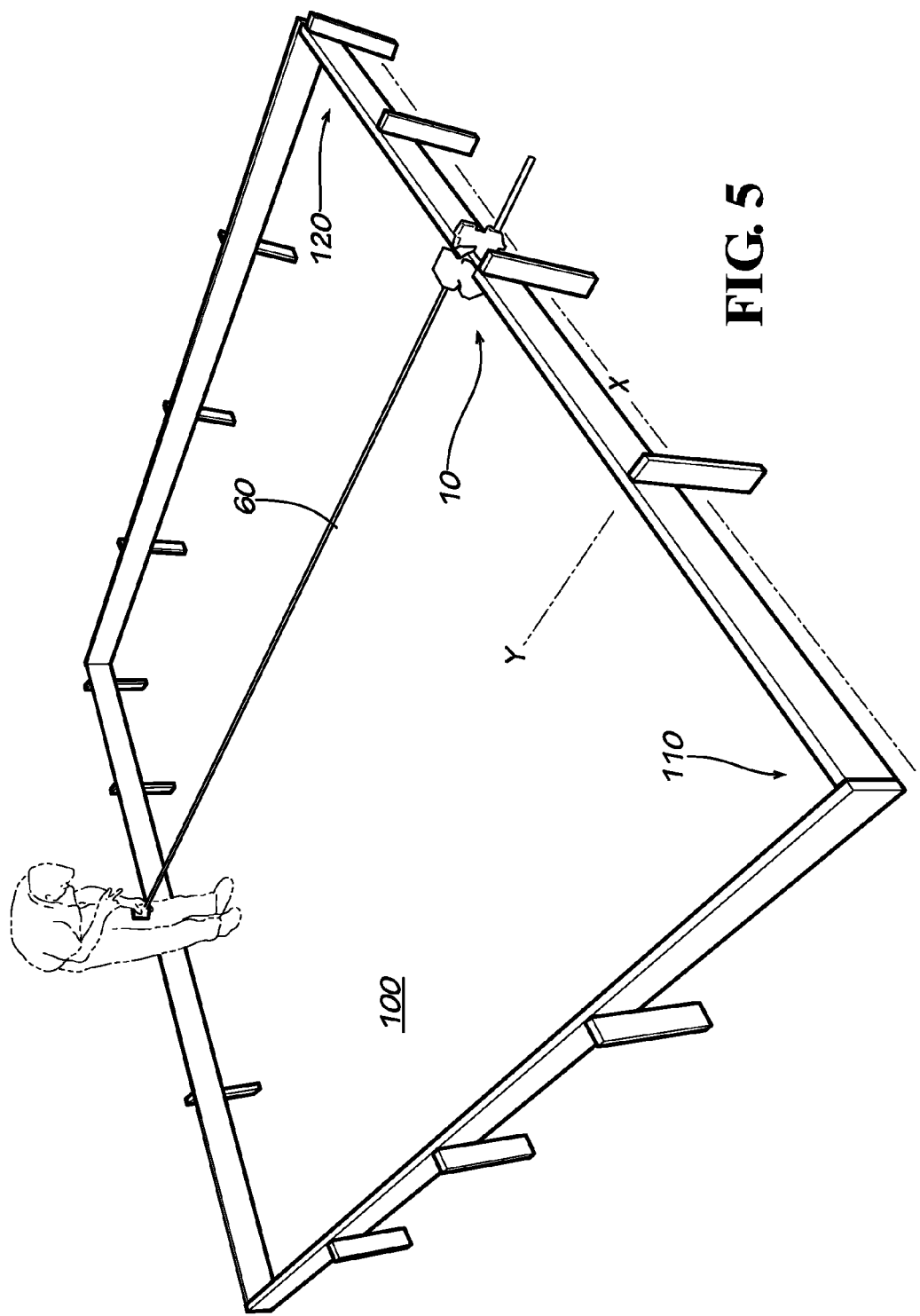
FIGS. 5-7 depict an example measuring system and method of operation according to additional aspects of the present invention.
Figure 6:
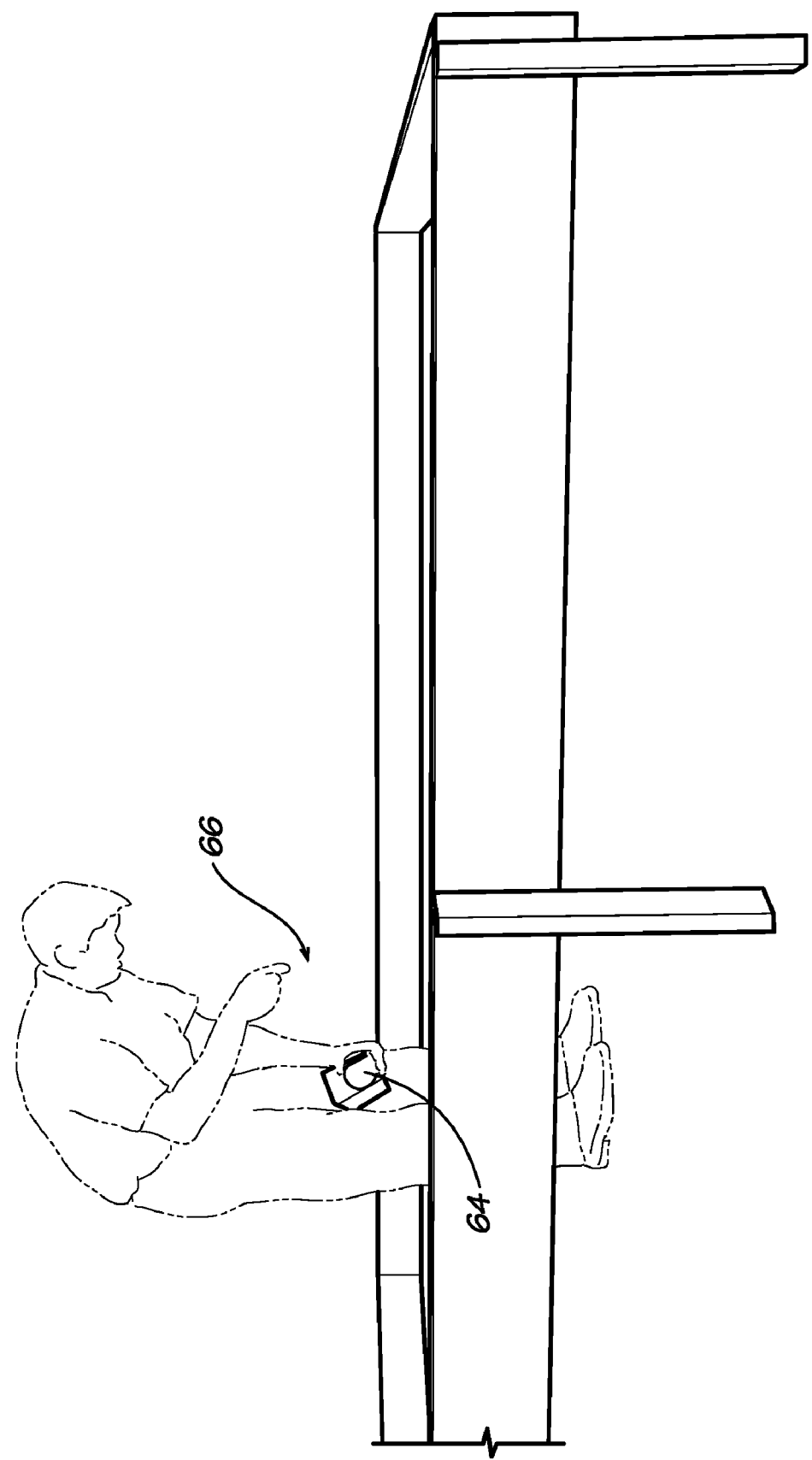
Figure 7:
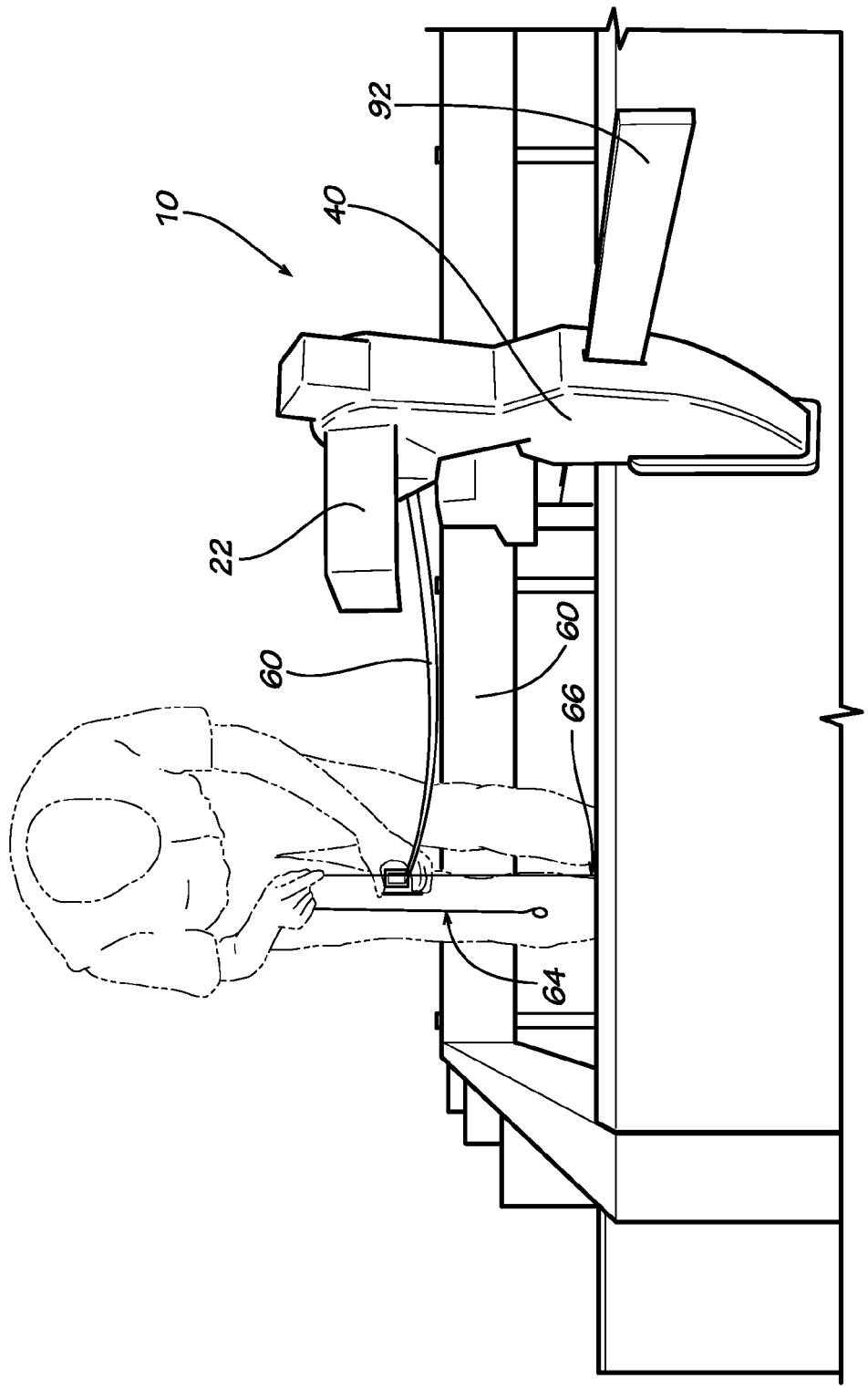

While the base structure 50 is depicted as a piece of dimensional lumber to simulate a slab edge form that is typically formed at a construction site before pouring a concrete base (and before the location of utilities is determined), the measuring apparatus can be coupled to/on various types of base structures. Typically, the apparatus 10 is coupled to the base structure 50 at the chosen location along the baseline of the same (denoted as X axis), as seen in FIG. 5. Next, a user can turn on laser 30, which should be oriented in a direction that is substantially perpendicular from the baseline X axis (and the face 52 of the underlying base structure 50) and denoted on FIG. 5 as the Y axis. In embodiments that include a rotatable option, a user can rotate the laser 30 until the laser is pointing 90 degrees from the face 52 of the underlying base (or alternative angle if desired). Optional lasers 34 and/or 36 are also turned on and emit light along a plane perpendicular to direction of laser 30. Thus, a user can optionally utilize first and/or second reflectors 110 and 120 to ensure that the apparatus 10 and laser 30 are truly perpendicular to the base structure by verifying that the reflectors are being illuminated with light from laser 34 and 36, respectively. Once it has been determined that laser 30 is oriented 90 degrees (or optional alternative angle) from the face 52 of the structure 50, a user can insert the tape hook 62 of a traditional tape measure 60 into the channel 70 of the apparatus 10 and pull the tape measure away from the face of the structure the desired distance. To ensure that the tape measure 60 is being pulled away from the structure 50 at the precise angle (in this case 90 degrees), the user can verify that the laser 30 is projecting light onto the tape measure. After pulling the tape measure 60 the desired distance from the structure 50, the user can drop a plumb line 66 towards the ground to determine the location of a particular utility (or otherwise) at an angle of 90 degrees (or alternative angle if desired) from the structure.

In still other example embodiments, the present invention is a kit for pulling measurements at a desired angle. The kit includes a measuring apparatus 10 as described above, a first reflector 110 and a measuring tape specially adapted to operate in conjunction with the measuring apparatus 10. For instance, such a measuring tape can include a reflective surface for easily aligning the tape with the laser 30 and/or a weighted articulating laser for pointing towards a location on the ground that is perpendicular to the tape. Optionally, the kit can include a second reflector 120 and/or a plumb line as desired.

While the invention has been described with reference to preferred and example embodiments, it will be understood by those skilled in the art that a variety of modifications, additions and deletions are within the scope of the invention, as defined by the following claims.

What is claimed is:

1. A measuring apparatus comprising:
a rigid body having a first laser and is adapted to receive a portion of a tape measure; and
means for coupling the rigid body to an underlying base structure,
wherein, the first laser is oriented such that light emitted from the laser is projected at substantially 90 degrees from a plane defined by a face of the underlying base structure.

2. The measuring apparatus of claim 1, wherein rigid body is removably coupled to the underlying base structure.

3. The measuring apparatus of claim 2, wherein the means for coupling the rigid body to the underlying base structure is selected from the group consisting of bar clamps, suction cups, screws, bolts, nails, pins, hooks, hook and loop fasteners, snaps, clips, brackets, and/or sleeves.

4. The measuring apparatus of claim 1, further comprising a second laser.

5. The measuring apparatus of claim 4, wherein the second laser emits light along a plane substantially parallel to the face of the underlying base structure.

6. The measuring apparatus of claim 4, further comprising a third laser.

7. The measuring apparatus of claim 6, wherein the third laser emits light along a plane substantially parallel to the face of the underlying base structure.

8. The measuring apparatus of claim 1, wherein the rigid body includes a channel operable to receive a tape hook therein.

9. The measuring apparatus of claim 8, wherein the channel includes a magnet therein.

10. The measuring apparatus of claim 1, wherein the rigid body includes a first level indicator to determine the orientation of the measuring apparatus about a first axis.

11. The measuring apparatus of claim 10, wherein the rigid body includes a second level indicator to determine the orientation of the measuring apparatus about a second axis.

12. A measuring system comprising:
a measuring apparatus comprising a rigid body having a first laser and means for removably coupling the rigid body to an underlying base structure, wherein the first laser is oriented such that light emitted from the first laser is projected at substantially 90 degrees from a plane defined by a face of the underlying base structure; and
a first reflector adapted to be removably secured to the underlying base structure.

13. The measuring system of claim 12, wherein the measuring apparatus includes a second laser oriented such that light emitted from the second laser is projected along a path substantially parallel to the plane defined by the face of the underlying base structure.

14. The measuring system of claim 13, further comprising a second reflector adapted to be removably secured to the underlying base structure.

15. The measuring system of claim 14, further comprising a tape measure having a reflector.

16. The measuring system of claim 15, further comprising a plumb line.

17. A method of measuring comprising the steps of:
coupling a measuring apparatus to an underlying structure having a first laser oriented at about 90 degrees from a face of the underlying structure and a second laser oriented along a plane that is substantially parallel with the face of the underlying structure;
securing a first reflector to the underlying structure;
aligning light emitted from the second laser with the first reflector;
coupling a tape measure to the measuring apparatus; and
pulling a measurement from the underlying structure.

18. The method of claim 17, further comprising the step of aligning light emitted from the first laser with the tape measure.

19. The method of claim 18, wherein the measuring apparatus includes a third laser.

20. The method of claim 19, further comprising the step of aligning light emitted from the third laser with a second reflector coupled to the underlying structure.

* * * * *